(12) United States Patent
Turner et al.

(10) Patent No.: US 7,094,027 B2
(45) Date of Patent: Aug. 22, 2006

(54) ROW OF LONG AND SHORT CHORD LENGTH AND HIGH AND LOW TEMPERATURE CAPABILITY TURBINE AIRFOILS

(75) Inventors: Mark Graham Turner, Cincinnati, OH (US); Paul David Orkwis, Loveland, OH (US); Richard David Cedar, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/305,833

(22) Filed: Nov. 27, 2002

(65) Prior Publication Data

US 2004/0101405 A1    May 27, 2004

(51) Int. Cl.
*F03B 1/04* (2006.01)
(52) U.S. Cl. ............... 415/194; 415/195; 416/175; 416/241 R
(58) Field of Classification Search ............. 415/194, 415/195; 416/203, 223 R, 223 A, 241 A, 416/241 B, 175
See application file for complete search history.

(56) References Cited

U.S. PATENT DOCUMENTS

| | | | |
|---|---|---|---|
| 910,266 | A | 1/1909 | Belluzzo |
| 2,920,864 | A | 1/1960 | Lee |
| 3,347,520 | A * | 10/1967 | Oweczarek ........... 415/119 |
| 4,758,129 | A | 7/1988 | Strock et al. |
| 5,152,661 | A | 10/1992 | Sheets |
| 5,236,307 | A | 8/1993 | Ng et al. |
| 5,299,914 | A | 4/1994 | Schilling |
| 5,584,652 | A | 12/1996 | Shaffer et al. |
| 5,634,768 | A | 6/1997 | Shaffer et al. |
| 5,706,647 | A | 1/1998 | Frey et al. |
| 6,197,424 | B1 | 3/2001 | Morrison et al. |
| 6,402,458 | B1 | 6/2002 | Turner |

OTHER PUBLICATIONS

Shackleford et al., CRC Materials Science and Engineering Handbook, 1994, CRC Press, Second Edition, pp. 262-263.*

* cited by examiner

*Primary Examiner*—Edward K. Look
*Assistant Examiner*—Dwayne J White
(74) *Attorney, Agent, or Firm*—William Scott Andes; Steven J. Rosen

(57) ABSTRACT

A gas turbine engine turbine stage has an annular row of turbine airfoils including a first plurality of first airfoils having a first chord length and a second plurality of second airfoils having a second chord length shorter than the first chord length. At least one of the second airfoils is circumferentially disposed between each adjacent pair of the first airfoils. A second leading edges of the second airfoils are located downstream of first leading edges of the first airfoils. The first and second airfoils have different first and second temperature capabilities respectively and the first temperature capability is greater than the second temperature capability. The first and second airfoils may be made from different alloys and/or the second airfoils may be constructed to use lower amounts of cooling airflow than the first airfoils. More than one of the second airfoils may be disposed between each pair of the first airfoils.

24 Claims, 3 Drawing Sheets

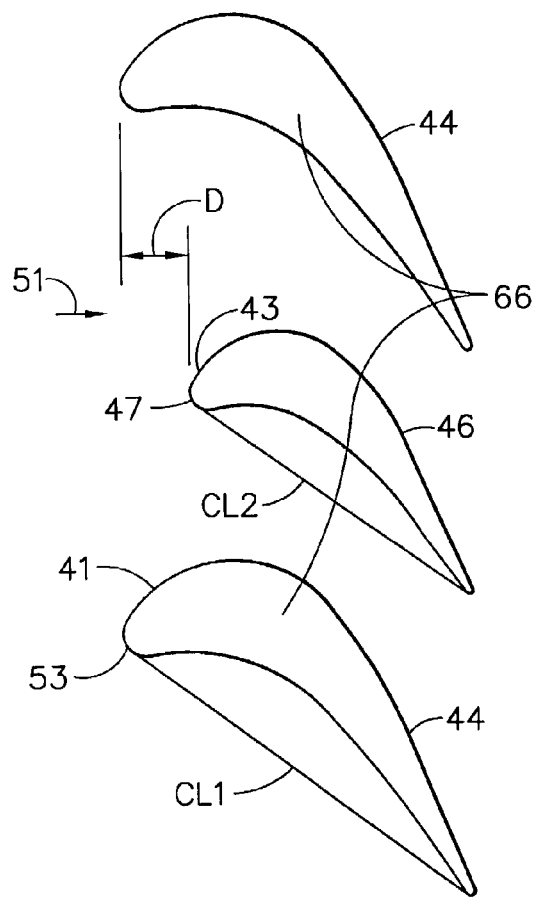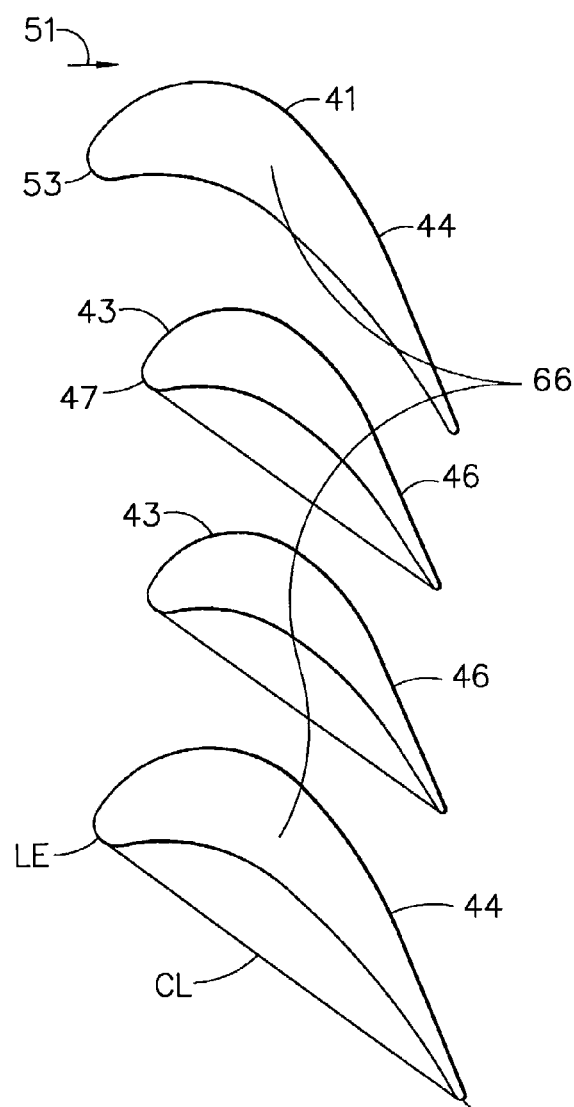
FIG. 3
FIG. 4

ROW OF LONG AND SHORT CHORD LENGTH AND HIGH AND LOW TEMPERATURE CAPABILITY TURBINE AIRFOILS

BACKGROUND OF THE INVENTION

The present invention relates generally to gas turbine engines and, more specifically, to turbines therein.

In a gas turbine engine, air is pressurized in a compressor and mixed with fuel in a combustor for generating hot combustion gases which flow downstream through multiple turbine stages. A turbine stage includes a stationary turbine nozzle having stator vanes which guide the combustion gases through a downstream row of turbine rotor blades extending radially outwardly from a supporting disk which is powered by extracting energy from the gases.

A first stage or high pressure turbine nozzle first receives the hottest combustion gases from the combustor which are directed to the first stage rotor blades which extract energy therefrom. A second stage turbine nozzle is disposed immediately downstream from the first stage blades and is followed in turn by a row of second stage turbine rotor blades which extract additional energy from the combustion gases.

As energy is extracted from the combustion gases, the temperature thereof is correspondingly reduced. However, since the gas temperature is relatively high, the high pressure turbine stages are typically cooled by channeling through the hollow vane and blade airfoils cooling air bled from the compressor and/or are made of high temperature capability and high heat resistant materials. The greater the temperature capability of the turbine materials are, the more expensive the turbine airfoils are. Since the cooling air is diverted from the combustor, the overall efficiency of the engine is correspondingly reduced. It is therefore highly desirable to minimize the use of such cooling air for maximizing overall efficiency of the engine and reduce the expense of the airfoils by using turbine materials having lower heat resistance properties.

The amount of cooling air required is dependent on the temperature of the combustion gases. That temperature varies from idle operation of the engine to maximum power operation thereof. Since combustion gas temperature directly affects the maximum stress experienced in the vanes and blades, the cooling air requirement for the turbine stages must be effective for withstanding the maximum combustion gas temperature operation of the engine although that running condition occurs for a relatively short time during engine operation.

For example, a commercial aircraft gas turbine engine which powers an aircraft in flight for carrying passengers or cargo experiences its hottest running condition during aircraft takeoff. For a military aircraft engine application, the hottest running condition depends on the military mission, but typically occurs during takeoff with operation of an afterburner. And, for a land-based gas turbine engine which powers an electrical generator, the hottest running condition typically occurs during the hot day peak power condition.

The maximum combustion gas temperature therefore varies temporally over the operating or running condition of the engine. The maximum combustion gas temperature also varies spatially both circumferentially and radially as the gases are discharged from the outlet annulus of the combustor. This spatial temperature variation is typically represented by combustor pattern and profile factors which are conventionally known. The highest temperature environment occurs in a portion of the gas flow where hot streaks from the combustor causes temperature variations in upstream airfoil rows in the stator vanes or nozzles and in the rotating blades. Unsteadiness caused by upstream wakes and hot streaks causes a pattern in the gas flow through the turbine where the airfoil is hot, the pressure side is hotter than the suction side, and the middle of the passage is cold. In a rotor, a variation circumferentially in the absolute frame causes an upstream unsteady disturbance. Cold nozzle wakes and combustor hot streaks produce large unsteady temperature variations.

Accordingly, each turbine stage, either blades or vanes, is typically specifically designed for withstanding the maximum combustion gas temperature experienced both temporarily and spatially in the combustion gases disposed directly upstream therefrom. Since the airfoils in each row of vanes and blades are identical to each other, the cooling configurations therefor and materials and material properties thereof are also identical and are effective for providing suitable cooling and heat resistance at the maximum combustion gas temperatures experienced by the individual stages for maintaining the maximum airfoil stress, including thermal stress, within acceptable limits for ensuring a suitable useful life of the turbine stages.

It is therefore highly desirable to have a gas turbine engine and its turbine airfoils with reduced temperature capability and where required with reduced cooling requirements.

SUMMARY OF THE INVENTION

A gas turbine engine turbine stage assembly having an annular row of turbine airfoils. The annular row of turbine airfoils includes a first plurality of first airfoils having a first chord length and a second plurality of second airfoils having a second chord length shorter than the first chord length. At least one of the second airfoils is circumferentially disposed between each adjacent pair of the first airfoils second leading edges of the second airfoils which are located downstream of first leading edges of the first airfoils. The first and second airfoils have different first and second temperature capabilities, respectively, and the first temperature capability is greater than the second temperature capability. The first and second airfoils' different first and second temperature capabilities may be accomplished by having the first and second airfoils made from different alloys or having the second airfoils constructed to use lower amounts of cooling airflow than the first airfoils or a combination of both these methods. More than one of the second airfoils may be disposed between each pair of the first airfoils.

One embodiment of the assembly is a gas turbine engine turbine stage having axially adjacent annular upstream and downstream rows of turbine airfoils. The annular downstream row of the turbine airfoils includes a first plurality of first airfoils having a first chord length and a second plurality of second airfoils having a second chord length shorter than the first chord length. At least one of each of the second airfoils is circumferentially disposed between each pair of the first airfoils. Second leading edges of the second airfoils are located downstream of first leading edges of the first airfoils. The first and second airfoils having different first and second temperature capabilities, respectively, wherein the first temperature capability is greater than the second temperature capability. In yet another embodiment of the assembly, the annular upstream row of the turbine airfoils is in a first row of vanes and having a single airfoil chord length. The annular downstream row of the turbine airfoils is in a first rotor stage.

BRIEF DESCRIPTION OF THE DRAWINGS

The foregoing aspects and other features of the invention are explained in the following description, taken in connection with the accompanying drawings where:

FIG. 3 is a planform view illustration of an arrangement of the airfoils illustrated in FIG. 2.

FIG. 4 is a planform view illustration of an alternative arrangement of the airfoils illustrated in FIG. 2.

DETAILED DESCRIPTION OF THE INVENTION

Figure 1:
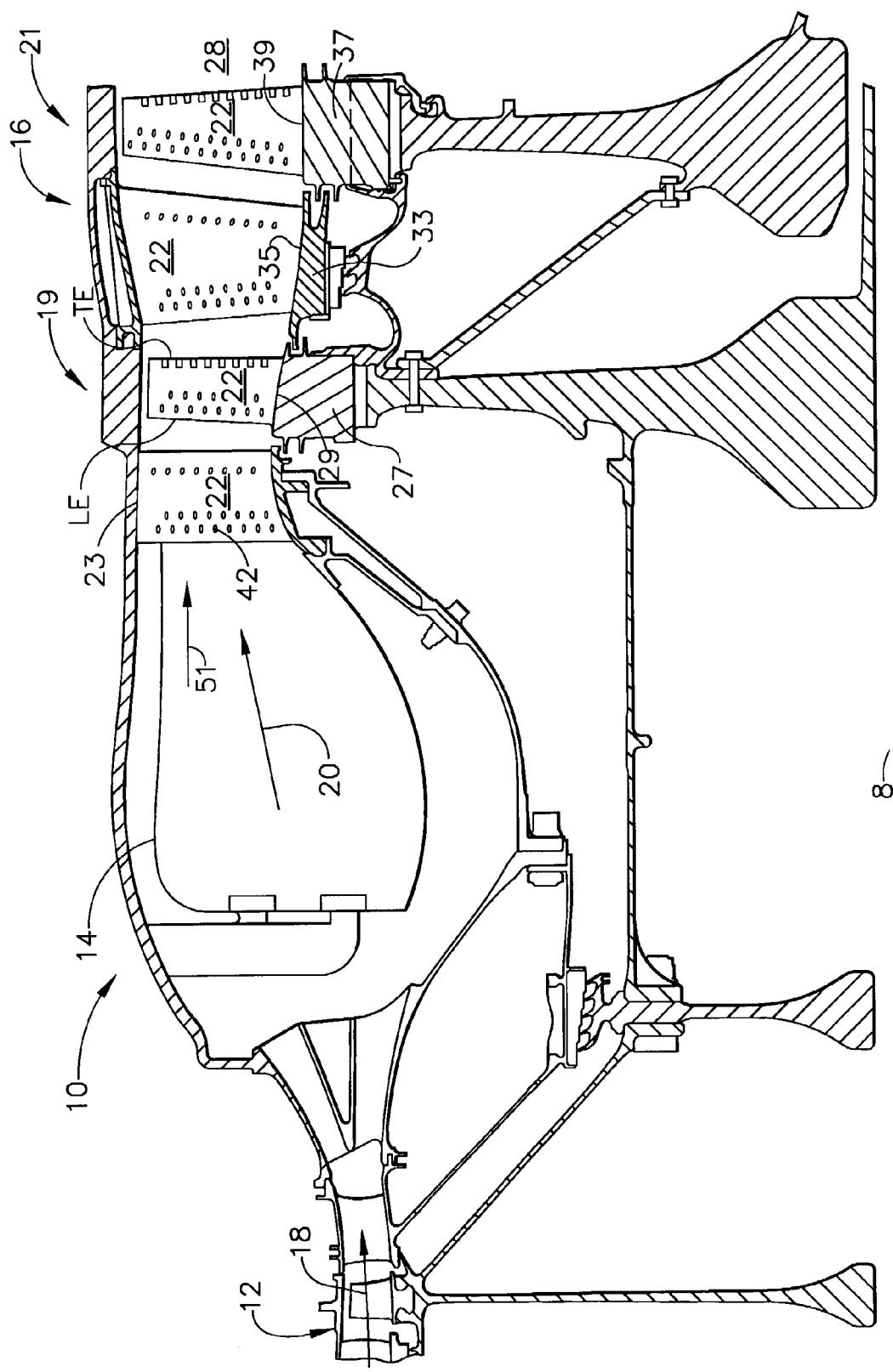
FIG. 1 is a fragmentary axial cross-sectional view illustration of a portion of a gas turbine engine having an exemplary embodiment of rows of cooled turbine airfoils having two different chord lengths in a row.

Illustrated in FIG. 1 are combustor and high pressure turbine portions of a turbofan gas turbine engine 10. The engine 10 is circumscribed about a centerline axis 8 and includes in downstream serial flow communication a fan (not shown), a multistage axial compressor 12 (shown in part), an annular combustor 14, a two-stage high pressure turbine 16, and a multistage low pressure turbine (not shown). During operation, air 18 is pressurized in the compressor and mixed with fuel in the combustor for generating hot combustion gases 20 which flow downstream through the high and low pressure turbines which extract energy therefrom. The high pressure turbine powers the compressor, and the low pressure turbine powers the fan in a conventional configuration for propelling the aircraft in flight from takeoff, cruise, descent, and landing.

Figure 2:
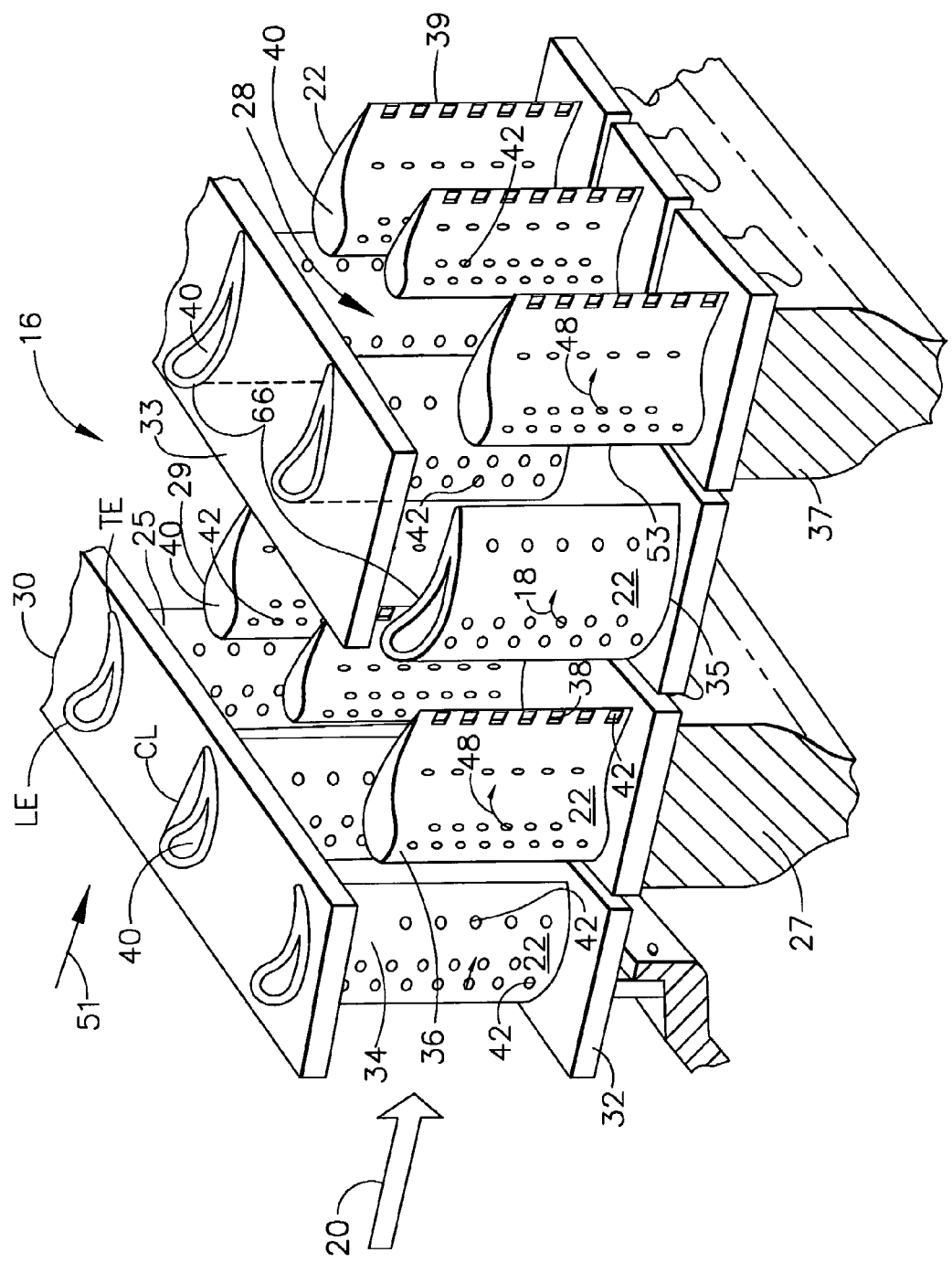
FIG. 2 is a perspective view illustration of turbine stages illustrated in FIG. 1.

Further illustrated in FIG. 2, are first and second stages 19 and 21 of the high pressure turbine 16 in downstream serial flow communication. The first stage 19 includes in downstream serial flow communication, a first nozzle 23 having a first row of vanes 25 and a first rotor stage 27 having a first row of rotor blades 29. The second stage 21 includes in downstream serial flow communication a second nozzle 33 having a second row of vanes 35 and a second rotor stage 37 having a second row of rotor blades 39. Each of the rows of blades and vanes include a row of turbine airfoils 22 extending across a hot gas flowpath 28. The turbine airfoils 22 have chord lengths CL extending in a downstream direction 51 from leading edges LE to trailing edges TE.

The engine 10 operates at varying running conditions or power from idle, takeoff, cruise, descent, and landing. The maximum temperature of the combustion gases 20 generated during operation varies temporally and correspondingly with the various running conditions. The combustion gases 20 discharged from the combustor 14 during engine operation have a spatial temperature distribution that varies both circumferentially and radially between the turbine airfoils 22. Unsteady hot streaks generated by an upstream row 34 of the airfoils 22 impact a next downstream row 36 of the airfoils. The airfoils 22 must be provided with thermal protection and have sufficient thermal capability or temperature capability to withstand the hot environment the flow anomalies cause. Since the turbine airfoils 22 are bathed in the hot combustion gases 20 during engine operation, they must have a certain degree of temperature capability. Conventionally, different degrees of temperature capability are used for airfoils in different stages depending on how hot the combustion gases 20 are at the stage where the turbine airfoils 22 are located. The combustion gases 20 in the high pressure turbine 16 are much hotter than in the low pressure turbine. The temperature distribution may be analytically determined using modern three-dimensional computational fluid dynamics (CFD) software in a conventional manner as well as empirically.

Referring further to FIG. 3, the row of the turbine airfoils 22 in the first row of rotor blades 29 in the first rotor stage 27 and the second row of vanes 35 and the second row of rotor blades 39 in the second stage 21 include a first plurality 41 of first airfoils 44 having a first chord lengths CL1 and a second plurality 43 of second airfoils 46 having a second chord length CL2 that is shorter than the first chord length CL1. At least one of the second airfoils 46 is circumferentially disposed between each pair 66 of the first airfoils 44. Second leading edges 47 of the second airfoils 46 are located a distance D downstream of first leading edges 53 of the first airfoils 44. In order to save costs for both the manufacturing of the airfoils and the operation of the engine, the first and second airfoils 44 and 66 have different first and second temperature capabilities, respectively, and the first temperature capability is greater than the second temperature capability. More than one of the second airfoils 46 may be circumferentially disposed between each pair 66 of the first airfoils 44 as illustrated in FIG. 4 with two of the second airfoils 46 circumferentially disposed between each pair 66 of the first airfoils 44.

The first airfoils 44 with the longer first chord lengths CL1 hide the second airfoils 46 from the unsteady hot streaks generated by an upstream row 34 of airfoils because the second leading edges 47 of the second airfoils 46 are located downstream of first leading edges 53 of the first airfoils 44. The second airfoils 46 with the shorter second chord lengths CL2 operate in a cooler environment and, thus, need less cooling airflow 48, less expensive materials, or will yield higher life parts. The lower second temperature capability of the second airfoils allows the use of second airfoils that require less cooling airflow and less expensive materials. Less cooling flow results in a more efficient component or engine.

In one exemplary embodiment of the airfoils 22, the second airfoils 46 are constructed to use lower amounts of the cooling airflow 48 than the first airfoils 44. In another exemplary embodiment of the airfoils 22, the first and second airfoils 44 and 46 are constructed from different alloys. Yet in another exemplary embodiment of the airfoils 22, a combination of the two previous embodiments are used and the second airfoils 46 are constructed to use lower amounts of cooling airflow 48 than the first airfoils 44 and the first and second airfoils 44 and 46 are constructed from different alloys.

Referring back to FIG. 2, the turbine airfoils 22 in the HPT are typically cooled in a conventional manner using, for example, various internal and external cooling features. A portion of the compressor air 18 is diverted from the compressor and used as cooling air channeled through the several airfoils for internal cooling thereof. The airfoils 22 include at least one internal cooling airflow circuit 40 and film cooling holes or apertures 42 extending through the opposite pressure and suction sidewalls thereof for discharging the cooling air into the gas flowpath 28 from the cooling airflow circuit 40. The apertures may be configured in rows of film cooling holes and/or trailing edge slots 38, and may be disposed in either or both sidewalls of each airfoil. The cooling air from inside each airfoil 22 is discharged through the various apertures to provide protective films of cooling air on the external surfaces of the airfoils for additional protection from the hot combustion gases.

The present invention may be used in a single stage high pressure turbine or a high pressure turbine with counter rotating rotors.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

1. A gas turbine engine turbine stage assembly comprising:
   an annular row of turbine airfoils including first and second pluralities of first and second turbine airfoils respectively,
   the first plurality of first turbine airfoils having a first chord length,
   the second plurality of second turbine airfoils having a second chord length shorter than the first chord length,
   at least one of the second turbine airfoils circumferentially disposed between each adjacent pair of the first turbine airfoils,
   second leading edges of the second turbine airfoils located downstream of first leading edges of the first turbine airfoils, and
   the first and second turbine airfoils having different first and second temperature capabilities respectively wherein the first temperature capability is greater than the second temperature capability.

2. An assembly as claimed in claim 1 wherein the first and second turbine airfoils are made from different alloys.

3. An assembly as claimed in claim 1 wherein the second turbine airfoils are constructed to use lower amounts of cooling airflow than the first turbine airfoils.

4. An assembly as claimed in claim 1 wherein the first and second turbine airfoils are made from different alloys and the second turbine airfoils are constructed to use lower amounts of cooling airflow than the first turbine airfoils.

5. An assembly as claimed in claim 1 further comprising more than one of the second turbine airfoils circumferentially disposed between each adjacent pair of the first turbine airfoils,
   second leading edges of the second turbine airfoils located downstream of first leading edges of the first turbine airfoils, and
   the first and second turbine airfoils having different first and second temperature capabilities respectively wherein the first temperature capability is greater than the second temperature capability.

6. An assembly as claimed in claim 5 wherein the first and second turbine airfoils are made from different alloys.

7. An assembly as claimed in claim 5 wherein the second turbine airfoils are constructed to use lower amounts of cooling airflow than the first turbine airfoils.

8. An assembly as claimed in claim 5 wherein the first and second turbine airfoils are made from different alloys and the second turbine airfoils are constructed to use lower amounts of cooling airflow than the first turbine airfoils.

9. A gas turbine engine turbine stage assembly comprising:
   axially adjacent annular upstream and downstream rows of turbine airfoils,
   the annular downstream row of the turbine airfoils includes a first plurality of first turbine airfoils having a first chord length and a second plurality of second turbine airfoils having a second chord length shorter than the first chord length,
   at least one of each of the second turbine airfoils circumferentially disposed between each adjacent pair of the first turbine airfoils,
   second leading edges of the second turbine airfoils located downstream of first leading edges of the first turbine airfoils, and
   the first and second turbine airfoils having different first and second temperature capabilities respectively wherein the first temperature capability is greater than the second temperature capability.

10. An assembly as claimed in claim 9 wherein the first and second turbine airfoils are made from different alloys.

11. An assembly as claimed in claim 9 wherein the second turbine airfoils are constructed to use lower amounts of cooling airflow than the first turbine airfoils.

12. An assembly as claimed in claim 9 wherein the first and second turbine airfoils are made from different alloys and the second turbine airfoils are constructed to use lower amounts of cooling airflow than the first turbine airfoils.

13. An assembly as claimed in claim 9 further comprising more than one of the second turbine airfoils circumferentially disposed between each adjacent pair of the first turbine airfoils,
   second leading edges of the second turbine airfoils located downstream of first leading edges of the first turbine airfoils, and
   the first and second turbine airfoils having different first and second temperature capabilities respectively wherein the first temperature capability is greater than the second temperature capability.

14. An assembly as claimed in claim 13 wherein the first and second turbine airfoils are made from different alloys.

15. An assembly as claimed in claim 13 wherein the second turbine airfoils are constructed to use lower amounts of cooling airflow than the first turbine airfoils.

16. An assembly as claimed in claim 13 wherein the first and second turbine airfoils are made from different alloys and the second turbine airfoils are constructed to use lower amounts of cooling airflow than the first turbine airfoils.

17. An assembly as claimed in claim 9 further comprising the annular upstream row of the turbine airfoils being in a first row of vanes and having a single airfoil chord length and the annular downstream row of the turbine airfoils being in a first rotor stage.

18. An assembly as claimed in claim 17 wherein the first and second turbine airfoils are made from different alloys.

19. An assembly as claimed in claim 17 wherein the second turbine airfoils include second internal cooling airflow circuits that use lower amounts of cooling airflow than second internal cooling airflow circuits in the first turbine airfoils.

20. An assembly as claimed in claim 17 wherein the first and second turbine airfoils are made from different alloys and the second turbine airfoils are constructed to use lower amounts of cooling airflow than the first turbine airfoils.

21. An assembly as claimed in claim 17 further comprising more than one of the second turbine airfoils circumferentially disposed between each adjacent pair of the first turbine airfoils, second leading edges of the second turbine airfoils located downstream of first leading edges of the first turbine airfoils, and the first and second turbine airfoils having different first and second temperature capabilities respectively wherein the first temperature capability is greater than the second temperature capability.

22. An assembly as claimed in claim 21 wherein the first and second turbine airfoils are made from different alloys.

23. An assembly as claimed in claim 21 wherein the second turbine airfoils are constructed to use lower amounts of cooling airflow than the first turbine airfoils.

24. An assembly as claimed in claim 21 wherein the first and second turbine airfoils are made from different alloys and the second turbine airfoils are constructed to use lower amounts of cooling airflow than the first turbine airfoils.

* * * * *